(12) United States Patent
Abe et al.

(10) Patent No.: US 6,820,007 B2
(45) Date of Patent: Nov. 16, 2004

(54) VEHICLE OPERATION ASSIST CONTROL SYSTEM

(75) Inventors: Masato Abe, 33-80 Higashi-Tamagawagakuen 1-chome, Machida-shi, Tokyo (JP); Yoshimi Furukawa, Tokyo (JP)

(73) Assignees: Honda Giken Kogyo Kabushiki Kaisha, Tokyo (JP); Masato Abe, Tokyo (JP)

( * ) Notice: Subject to any disclaimer, the term of this patent is extended or adjusted under 35 U.S.C. 154(b) by 0 days.

(21) Appl. No.: 10/392,854

(22) Filed: Mar. 21, 2003

(65) Prior Publication Data

US 2003/0220738 A1 Nov. 27, 2003

(30) Foreign Application Priority Data

May 23, 2002 (JP) ........................................ 2002-149578

(51) Int. Cl.$^7$ ................................................. G06G 7/78
(52) U.S. Cl. ...................... 701/301; 180/167; 340/436
(58) Field of Search ................................. 701/301, 302, 701/96; 180/167, 168, 169; 340/435, 436

(56) References Cited

U.S. PATENT DOCUMENTS

| 5,798,695 A | 8/1998 | Metalis et al. ............... 340/576 |
| 6,567,749 B2 | 5/2003 | Matsuura ..................... 701/301 |

*Primary Examiner*—Yonel Beaulieu
(74) *Attorney, Agent, or Firm*—Arent Fox, PLLC

(57) ABSTRACT

Provided is a control system that assists the vehicle operator in avoiding an obstacle by making use of simple information on the surrounding environment, and the effectiveness of such a system was demonstrated by computer simulations. The lateral acceleration that would enable the vehicle to avoid an obstacle is converted into a target yaw rate, and this contributed to the improvement in the property of a man—vehicle system in avoiding an obstacle. The target yaw rate can be relatively easily achieved by controlling the fore-and-aft forces of the tires. In particular, by including a phase advance in the target yaw rate, the responsiveness of the evading motion can be increased and the stability of the vehicle can be improved at the same time.

3 Claims, 6 Drawing Sheets

*no assist control* fore-and-aft distance

*no phase advance* fore-and-aft distance

*phase advance* fore-and-aft distance

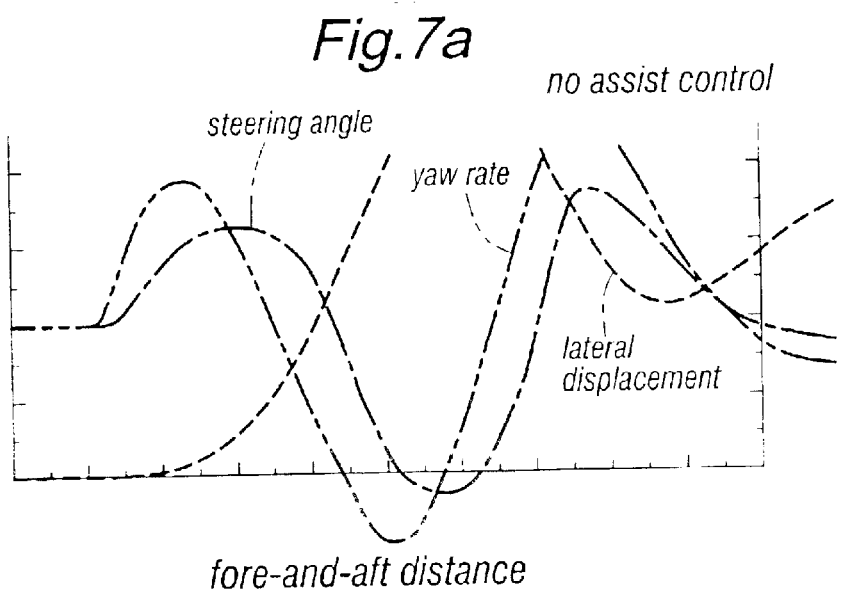
Fig. 7a — no assist control
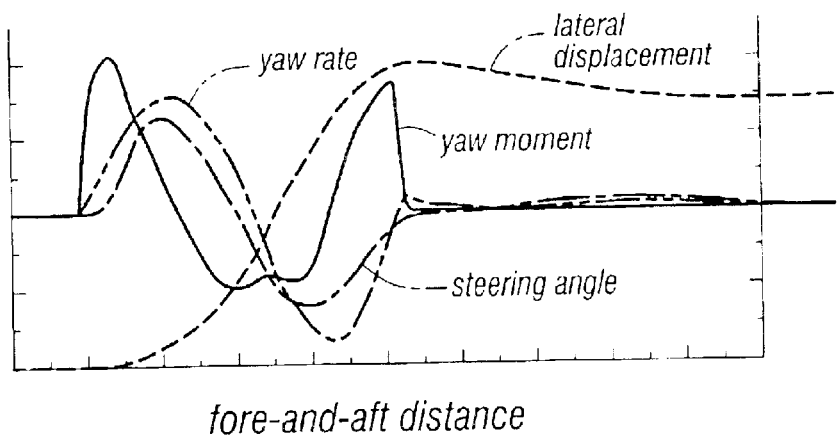
Fig. 7b — no phase advance
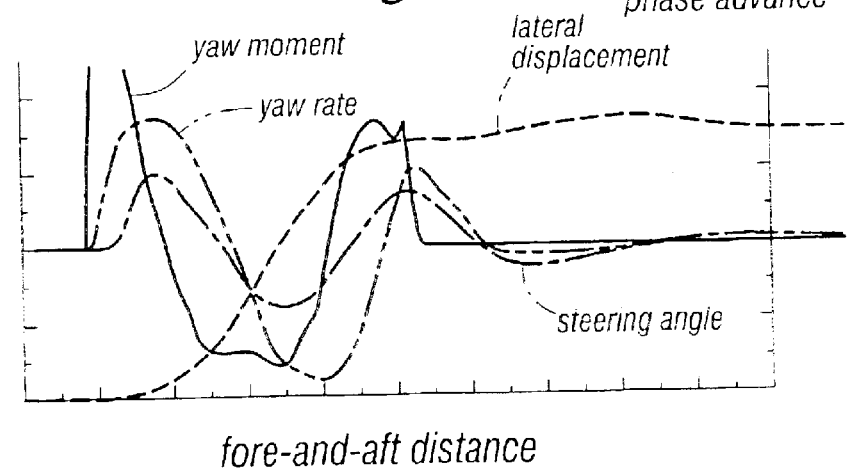
Fig. 7c — phase advance

VEHICLE OPERATION ASSIST CONTROL SYSTEM

TECHNICAL FIELD

The present invention relates to a vehicle operation assist control system, and in particular to a vehicle operation assist control system that detects an obstacle ahead and helps the vehicle operator take a corresponding evasive action.

BACKGROUND OF THE INVENTION

Various proposals have been made in connection with the systems known as ITS which are highly effective in preventing traffic accidents. For instance, copending U.S. patent application Ser. No. 09/985,635 filed Dec. 5, 2001 discloses a vehicle operation assist control system which detects an obstacle ahead and helps the vehicle operator take an evasive action. According to this prior proposal, when an obstacle is detected ahead, the steering angle is directly controlled and a corresponding yaw moment is applied to the vehicle or the steering assist force is controlled so as to cause the vehicle to take a path that evades the obstacle.

The evasive motion of the vehicle can be defined by the lateral motion or lateral acceleration of the vehicle. On the other hand, in assisting the vehicle operation, an evasive motion of the vehicle can be favorably accomplished by controlling the fore-and-aft forces of the tires. Based on such considerations, a vehicle operation assist control for evading an obstacle ahead can be favorably executed by converting the required lateral acceleration into a corresponding vehicle yaw rate, and applying a yaw moment to the vehicle so as to achieve such a yaw rate. However, in practice, due to the time delay in the control system, there is some difficulty in ensuring a required response speed for the evasive action. Depending on the particular condition, an evasive action may simply fail to be taken altogether, a discomfort may be caused to the vehicle operator, or the margin of the evasive action may be too small to be accepted.

BRIEF SUMMARY OF THE INVENTION

In view of such problems of the prior art, a primary object of the present invention is to provide a vehicle operation assist control system which allows a highly responsive evasive action to be taken in evading an obstacle ahead.

A second object of the present invention is to provide a vehicle operation assist control system which can favorably utilize a right and left drive force splitting system or a right and left independent brake system.

A third object of the present invention is to provide a vehicle operation assist control system which is both economical and practical to implement.

According to the present invention, such objects can be accomplished by providing a vehicle operation assist control system for assisting the operation of a vehicle, comprising; vehicle operation assist control system for assisting the operation of a vehicle, comprising; means for acquiring information on an obstacle ahead, the information including a distance to the obstacle and a width thereof; means for determining an evasive path of the vehicle for avoiding the obstacle according to the distance to the obstacle and the width thereof; means for computing a lateral acceleration for enabling the vehicle to follow the evasive path; means for converting the lateral acceleration to a yaw rate under a static condition; means for adding a phase advance term to the yaw rate; means for computing a yaw moment for achieving the yaw rate having the phase advance term added thereto; and means for producing the computed yaw moment in the vehicle.

This provides a vehicle operation assist control system which allows an obstacle to be evaded in a highly responsive manner, and such a system can be implemented as a relatively simple control system. Computer simulations have demonstrated that such a favorable system response can be obtained in a highly stable manner. To minimize the amount of computation, the path of the evasive motion may be defined as a simple sinusoidal mathematical function.

The means for acquiring information on an obstacle ahead may consist of a radar using ultrasonic wave, electromagnetic radiation or laser radiation, or an imaging device. Other functional means of the system according to the present invention may be implemented with a computer operating under appropriate programs.

The means for producing the computed yaw moment in the vehicle may comprise a right and left traction splitting device and/or a brake system capable of controlling the right and left brake forces independently.

BRIEF DESCRIPTION OF THE DRAWINGS

Now the present invention is described in the following with reference to the appended drawings, in which:

FIG. 7a is a graph showing various responses of the vehicle with respect to the fore-and-aft distance as the vehicle decelerates from 100 km/hour to 70 km/hour without the vehicle operation control;

FIG. 7b is a graph showing various responses of the vehicle with respect to the fore-and-aft distance as the vehicle decelerates from 100 km/hour to 70 km/hour with the vehicle operation control not incorporated with a phase advance; and FIG. 7c is a graph showing various responses of the vehicle with respect to the fore-and-aft distance as the vehicle decelerates from 100 km/hour to 70 km/hour with the vehicle operation control incorporated with a phase advance.

DETAILED DESCRIPTION OF THE PREFERRED EMBODIMENTS

If other vehicles traveling near the vehicle in question and fixed objects on the road can be detected and identified, it is possible to carry out a control process that would allow the vehicle in question to evade such obstacles. Here, it is assumed that a lane change is effected by applying a sinusoidal lateral acceleration to the vehicle according to the distance to the object ahead and width thereof. Lateral acceleration can be applied to the vehicle by various means including steering angle control and steering assist torque control. In the illustrated embodiment, instead of directly applying lateral acceleration to the vehicle, yaw moment is applied to the vehicle body by controlling the fore-and-aft forces that are produced in the right and left tires so as to cause the vehicle to change lanes. This is called direct yaw moment control (DYC). Such fore-and-aft forces can be produced by using a right and left drive force (traction) splitting system and/or a brake system that can independently control the right and left brake forces.

Figure 1:
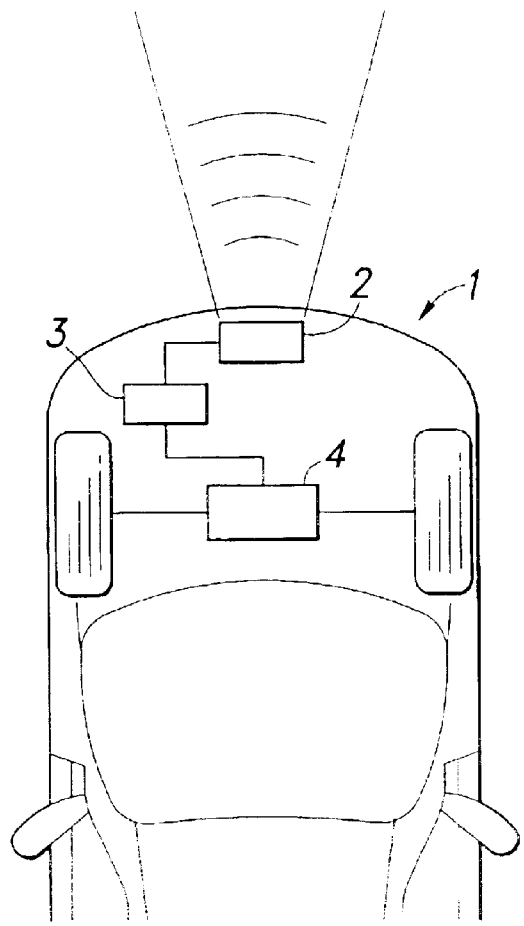
FIG. 1 is a schematic view of a vehicle equipped with a vehicle operation assist control system embodying the present invention.

The sinusoidal lateral acceleration that is required for effecting the required evasive motion in the form of a lane change is converted into a sinusoidal yaw rate, and the yaw moment that is required for producing such a yaw rate can be analytically derived by taking into account the tire model and vehicle feedback property. Such a yaw rate can be produced without human intervention, but it would be more practical to produce a yaw moment that assists the vehicle operator taking an evasive action. According to actually conducted computer simulations of a vehicle operation-vehicle system model, it was demonstrated that an action that allows the vehicle to evade an obstacle ahead in a favorable manner can be achieved. FIG. 1 shows a vehicle 1 equipped with an onboard radar 2 using ultrasonic sound wave. Other forms of radar or various imaging devices can be used for the same purpose. A control unit 3 controls the brake forces and/or tractions of the right and left wheels. The devices for controlling the brake forces and/or tractions of the right and left wheels are denoted with numeral 4.

Figure 2:
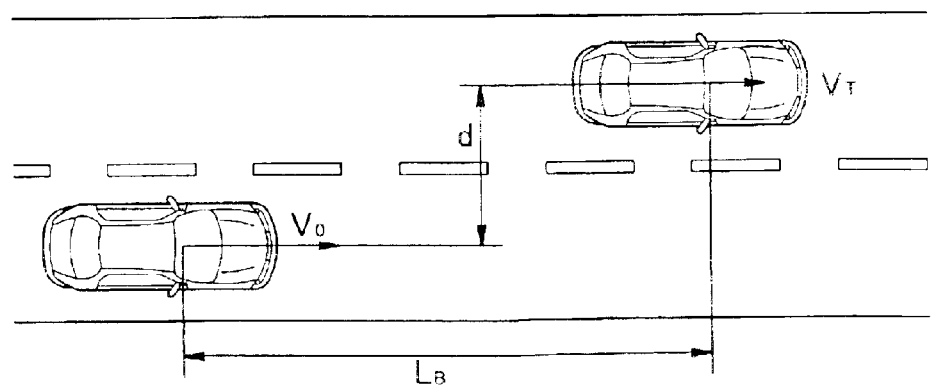
FIG. 2 is a diagram showing a vehicle changing lanes to avoid an obstacle ahead.

FIG. 2 shows a vehicle changing lanes by a lateral distance d over a fore-and-aft distance of $L_B$. The vehicle accelerates or decelerates from an initial speed of $V_0$ to a terminal speed of $V_T$. If the acceleration or deceleration during this process is constant, the following equations can be obtained.

$$t_B = 2L_B/(V_0+V_T) \quad (1)$$

$$a_x = (V_0^2 - V_T^2)/2L_B \quad (2)$$

where $t_B$ is the time required for changing lanes, and $a_x$ is the fore-and-aft acceleration of the vehicle.

Here, it is assumed that the vehicle is subjected to a sinusoidal lateral acceleration during the lane change, and it is expressed by the following equation.

$$a_y = a \sin(2\pi t/t_B) \quad (3)$$

The appropriate values for $L_B$, d and $V_T$ are determined according to the properties of the vehicle, relative position of the obstacle and road conditions.

Integrating this equation twice with respect to time under the initial condition of (dy/dt)=0 and y=0 at t=0 produces the following equation which gives the lateral displacement of the vehicle during the lane change. Here, it is assumed that the fore-and-aft distance $L_B$ is substantially greater than the width d, and the lateral acceleration of the vehicle is always directed in the direction of the lane change or in the lateral direction.

$$y = (at_B/2\pi)\{t - (t_B/2\pi) \sin(2\pi t/t_B)\} \quad (4)$$

If the vehicle can successfully change lanes by the lateral width d, this equation should satisfy the terminal condition or $t=t_B$ and y=d. Therefore, the amplitude of the sinusoidal acceleration which is applied to the vehicle to execute this lane change can be determined as given in the following.

$$a = 2\pi d/t_B^2 \quad (5)$$

When the vehicle receives an external force or an external moment so as to cause such a sinusoidal lateral acceleration, the vehicle can successfully execute a lane change that would allow the vehicle to evade the obstacle ahead.

Various chassis control methods for causing a prescribed motion to the vehicle are known. In this embodiment, the yaw moment produced by the independently variable fore-and-aft forces of the right and left tires is utilized for the lane change assist control. In particular, when changing lanes for the purpose of evading an obstacle ahead, a certain amount of braking action is necessary in most cases. Therefore, a desired DYC can be accomplished simply by utilizing the existing brake system instead of adding new hardware. Also, the DYC can be more easily accomplished by controlling the yaw rate of the vehicle than directly controlling the lateral acceleration of the vehicle. Therefore, in this embodiment, the sinusoidal lateral acceleration which is required for causing the vehicle to change lanes is achieved by controlling the yaw rate of the vehicle.

It can be understood from a two-degree of freedom two-dimensional model of a vehicle that there is a certain time delay in the lateral acceleration of the vehicle produced as a response to a yaw moment input. The lateral acceleration and yaw rate of the vehicle in response to a yaw moment input from outside can be given by the following equations.

$$(a/M_z)(s) = G_R V(1+T_a s)/(P+Qs+s^2) \quad (6)$$

$$(r/M_z)(s) = G_R V(1+T_R s)/(P+Qs+s^2) \quad (7)$$

where $P = (4L^2 K_f K_r/mIV^2)(1+AV^2))$ $Q = (2/mIV)[m\{L_f^2 K_f + L_r^2 K_r\} + 1(K_f+K_r)]$ $G_R = 2(K_f+K_r)/mIV$ $T_a = 2(L_r K_r - L_f K_f)/\{(K_f+K_r)V\}$ $T_R = mV/\{2(K_f+K_r)\}$ $A = m(L_r K_r - L_f K_f)/(2L^2 K_f K_r)$ By noting that $T_R >> T_a$, the relationship between the lateral acceleration and yaw rate can be obtained from the above equations as given in the following.

$$(a/r)(s) = V(1+T_a s)/(1+T_R s) \approx V/(1+\tau s) \quad (8)$$

where $\tau = mV/\{2(K_f+K_r)\} - (L_r K_r - L_f K_f)/\{(K_f+K_r)V\}$

It was observed by the inventors that the time delay of the lateral acceleration increases substantially in proportion to the increase in the vehicle speed. Therefore, under a steady-state condition, the product of the yaw rate and vehicle speed is simply equal to or proportional to the lateral acceleration, but the lateral acceleration that would give rise to a lane change necessary for the required evasive motion to occur can be obtained only if a phase advance term is added to the sinusoidal yaw response of the vehicle. When the lateral acceleration of the vehicle during the lane change expressed by Equation (3) is substituted into Equation (8), the yaw rate response required for the lane change can be given by the following equation.

$$r_m = (a/V)\{\sin(2\pi t/t_B) + \tau(2\pi/t_B)\cos(2\pi t/t_B)\} \quad (9)$$

This is a yaw rate model response taking into account a phase advance for the vehicle operation assist control during an evasive lane change based on DYC.

To introduce a control law for this vehicle operation assist control, the following sliding surface is defined.

$$s = r - r_m = 0 \quad (10)$$

The following equation is selected for the sliding condition.

$$ds/dt + ks = 0 \quad (11)$$

Substituting Equation (10) into Equation (11) yields the following equation.

$$dr/dt - dr_m/dt + k(r - r_m) = 0 \quad (12)$$

Meanwhile, the yaw movement of the vehicle subjected to the yaw moment for the assist control can be given by the following equation.

$$I(dr/dt) = 2(L_f Y_f - L_r Y_r) + M_z \quad (13)$$

By canceling the yaw angular acceleration from Equations (12) and (13), the yaw moment for the desired control can be given as follows.

$$M_z = -2(L_f Y_f - L_r Y_r) + I(dr_m/dt) - kI(r - r_m) \quad (14)$$

The model yaw rate response in terms of angular acceleration can be obtained from Equation (9) as given in the following.

$$dr_m/dt = (2\pi a/t_B V)\{\cos(2\pi t/t_B) - \tau(2\pi/t_B)\sin(2\pi t/t_B)\} \quad (15)$$

In Equation (14), the lateral forces $Y_f$ and $Y_r$ applied to the front and rear tires are given by the vehicle tire model, and the side slip angle required for the tire model is given by a model observer. The yaw rate r can be measured by using an onboard yaw rate sensor.

Figure 3:
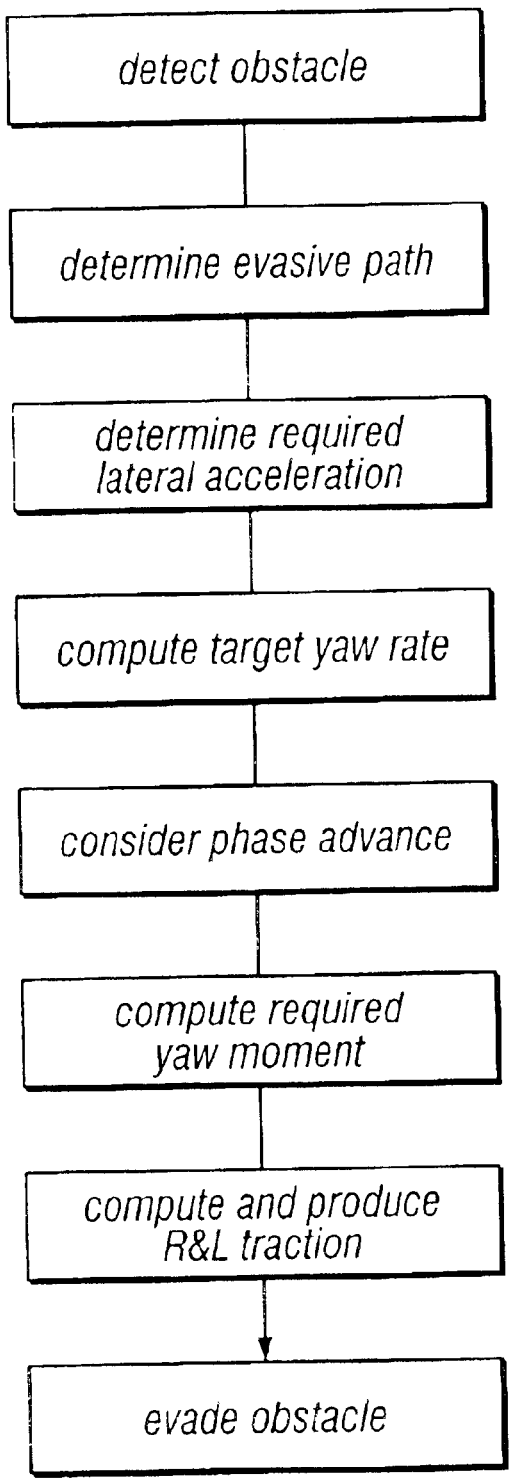
FIG. 3 is a flow chart showing the time sequence of the control action according to the present invention.

The process described above is summarized in the flow chart of FIG. 3. First of all, an obstacle ahead is detected and identified by the onboard radar 2, and $L_B$ and d are determined. An evasive path is then defined according to the determined $L_B$ and d by using Equation (4), and a corresponding sinusoidal lateral acceleration having an amplitude determined by Equation (5) is derived. A target yaw rate corresponding to the target lateral acceleration is computed from Equation (8). A phase advance is added to this target yaw rate to obtained a modified target yaw rate as expressed by Equation (9). The yaw moment required for achieving such a modified target yaw rate is computed. The corresponding right and left traction force or braking force is computed and produced so that the vehicle is allowed to evade the obstacle.

The inventors have conducted various computer simulations on a non-linear multi-degree of freedom vehicle model to evaluate the described vehicle operator assist control system. A model for the vehicle operator in the vehicle operator—vehicle simulation consisted of a first-order preview model, and was incorporated with an upper limit of the vehicle operation speed and a time delay in reaching the maximum vehicle operation speed. Before evaluating the effectiveness of the vehicle operation assist control in conducting a lane change, the advantage of incorporating a phase advance term in the yaw rate was verified by using computer simulations. The obtained results are summarized in FIGS. 4 and 5. To clearly demonstrate the results, the evasive action was achieved solely by the controlled yaw moment without the vehicle operator taking any steering action in these simulations. In other words, the steering wheel was fixed at the neutral position.

Figure 4A:
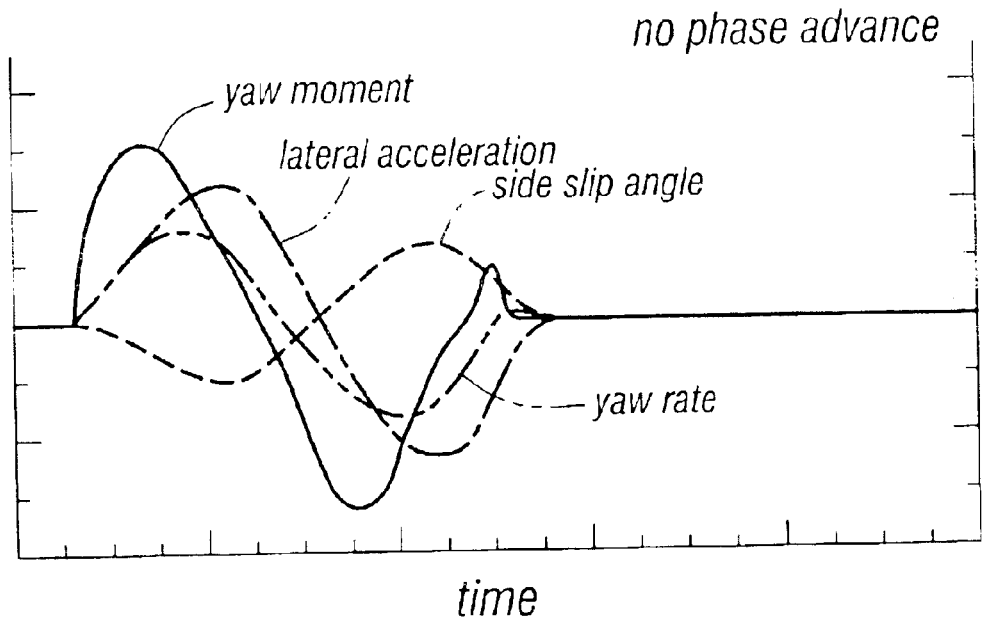
FIGS. 4a and 4b are graphs showing the time histories of yaw rate when evading an obstacle as the vehicle decelerates from 80 km/hour to 50 km/hour without and with a phase advance, respectively.
Figure 4B:
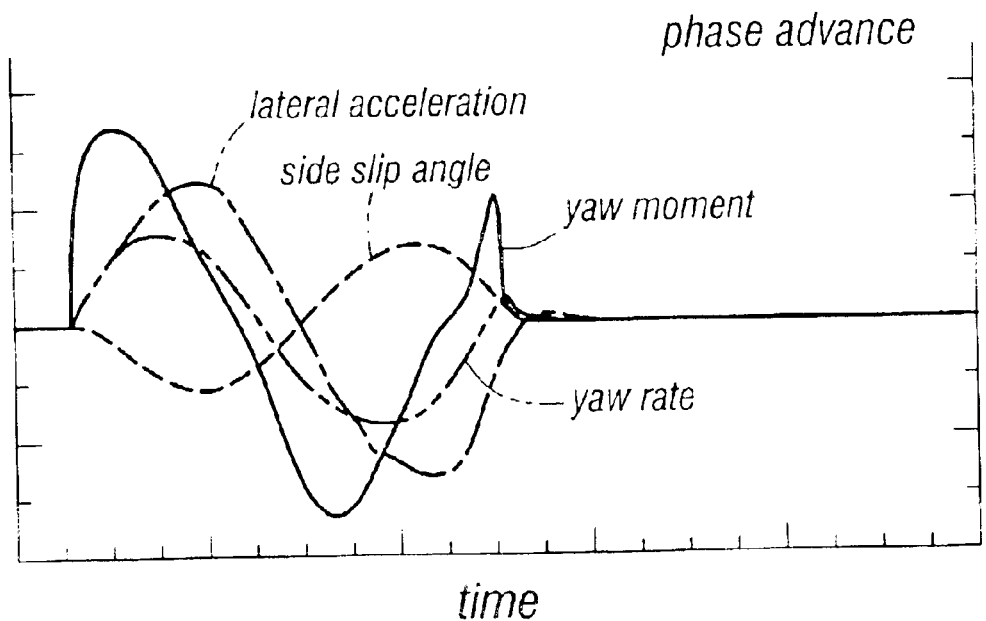
Figure 5A:
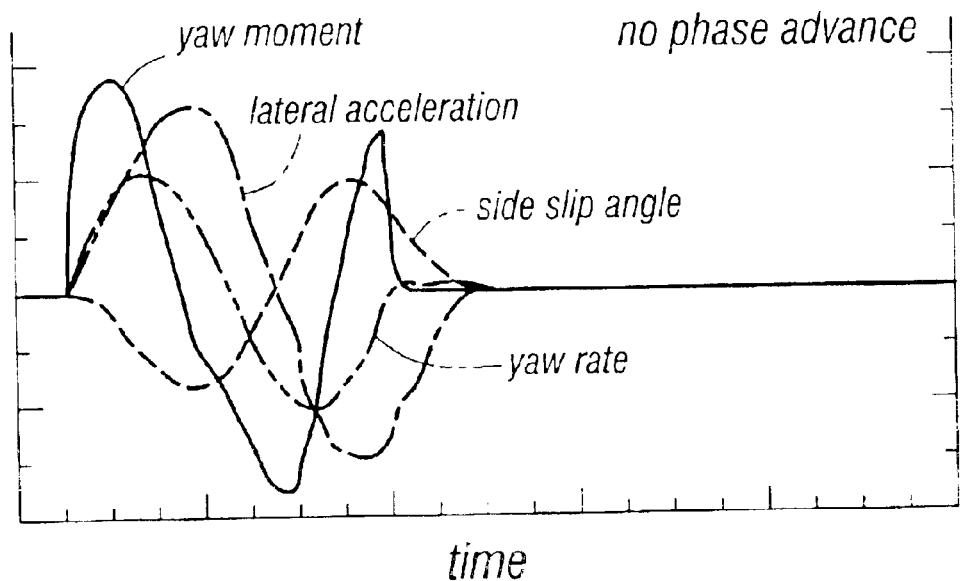
FIGS. 5a and 5b are graphs showing the time histories of yaw rate when evading an obstacle as the vehicle decelerates from 100 km/hour to 70 km/hour without and with a phase advance, respectively.
Figure 5B:
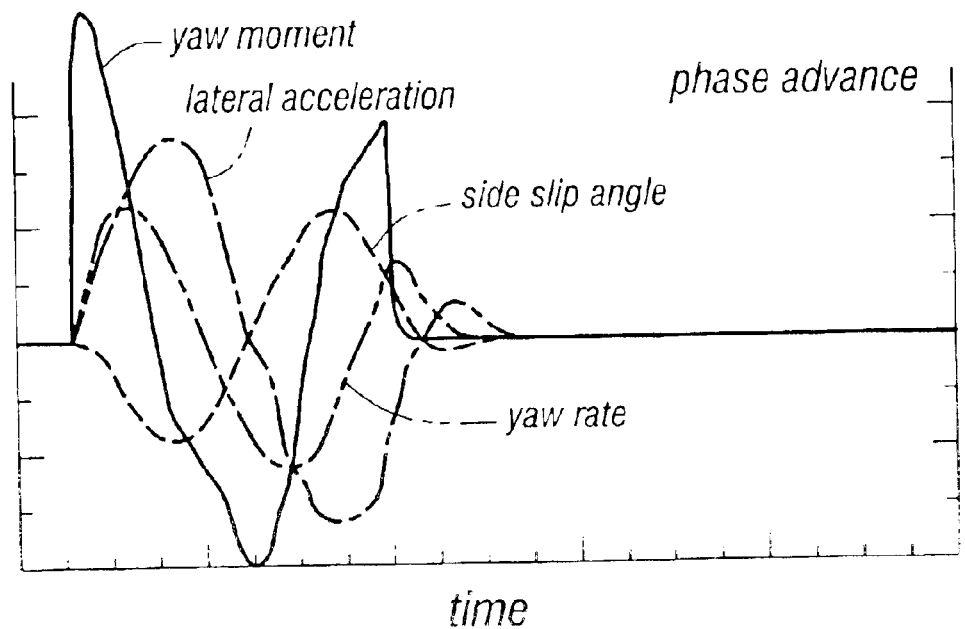

The graphs of FIGS. 4a and 4b show the yaw responses of the vehicle when avoiding an obstacle as it decelerates from 80 km/hour to 50 km/hour with and without incorporating the phase advance, respectively. The graphs of FIGS. 5a and 5b show the yaw responses of the vehicle when avoiding an obstacle as it decelerates from 100 km/hour to 70 km/hour with and without incorporating the phase advance, respectively.

In the phase advance approach, the yaw rate response was controlled in such a manner that a sinusoidal lateral acceleration of a prescribed pattern may be selected for the specific lane change. The effect of the phase advance was significant, and the desired sinusoidal lateral acceleration response was obtained by controlling the yaw rate response of the vehicle according to the computed yaw rate. In either case, the consideration of a phase advance improved the responsiveness of the lateral acceleration, and this was particularly the case in high speed ranges. The simulations indicated that the target lane change width should be selected somewhat greater than the actual lane change width for better results. This is due to the fact that the lateral displacement of the vehicle during the lane change deviates from the actual lateral direction, and this translates into a shortfall of the lateral displacement of the vehicle. The saturation property of the tires tends to reduce the actual lateral displacement from the value estimated from the given yaw moment input.

Figure 6A:
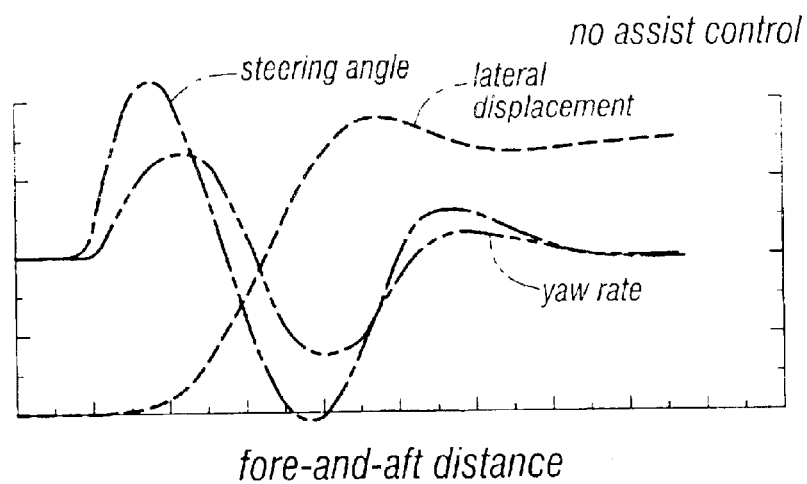
FIG. 6a is a graph showing various responses of the vehicle with respect to the fore-and-aft distance as the vehicle decelerates from 80 km/hour to 50 km/hour without the vehicle operation control.
Figure 6B:
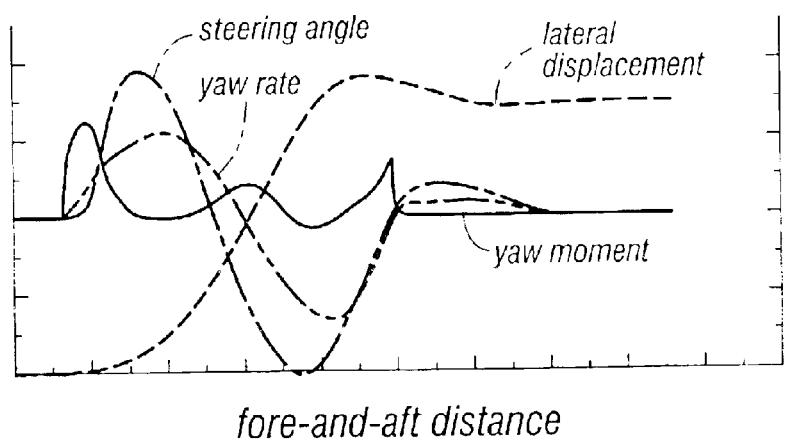
FIG. 6b is a graph showing various responses of the vehicle with respect to the fore-and-aft distance as the vehicle decelerates from 80 km/hour to 50 km/hour with the vehicle operation control not incorporated with a phase advance.
Figure 6C:
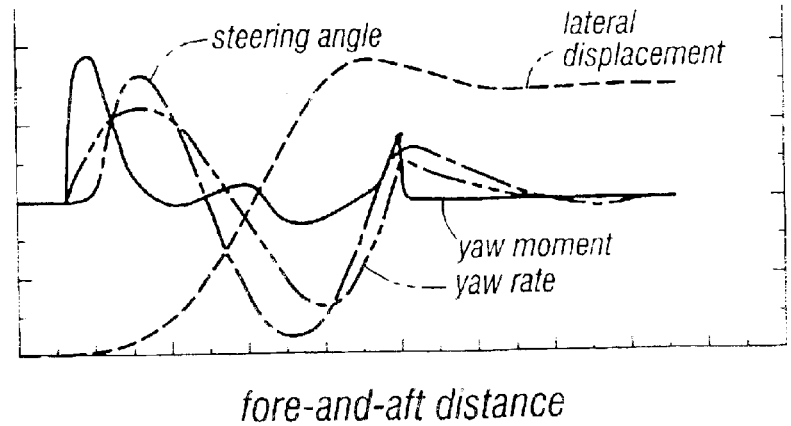
FIG. 6c is a graph showing various responses of the vehicle with respect to the fore-and-aft distance as the vehicle decelerates from 80 km/hour to 50 km/hour with the vehicle operation control incorporated with a phase advance.

FIGS. 6a, 6b and 6c show the vehicle responses when the vehicle avoids an obstacle as it decelerates from 80 km/hour to 50 km/hour. In this case, the steering input by the vehicle operator to evade the obstacle is taken into account. FIG. 6a shows the case where no assist control is used. FIGS. 6b and 6c show the cases where the assist control was carried out without and with the phase advance, respectively. FIGS. 7a, 7b and 7c similarly show the vehicle responses when the vehicle avoids an obstacle as it decelerates from 100 km/hour to 70 km/hour. In this case also, the effectiveness of the vehicle operator assist control was clearly demonstrated. In particular, it was verified that the inclusion of the phase advance not only improves the responsiveness of the evasive motion but also increases the stability of the vehicle.

In the foregoing disclosure, a control system was proposed that assists the vehicle operator by making use of simple information on the surrounding environment, and the effectiveness of such a system was demonstrated by computer simulations. The lateral acceleration that would enable the vehicle to avoid an obstacle is converted into a target yaw rate, and this contributed to the improvement in the property of a man—vehicle system in avoiding an obstacle. The target yaw rate can be relatively easily achieved by controlling the fore-and-aft forces of the tires. In particular, by including a phase advance in the target yaw rate, the responsiveness of the evading motion can be increased and the stability of the vehicle can be improved at the same time.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle operation assist control system for assisting the operation of a vehicle, comprising:

means for acquiring information on an obstacle ahead, said information including a distance to said obstacle and a width thereof;

means for determining an evasive path of said vehicle for avoiding said obstacle according to said distance to said obstacle and said width thereof;

means for computing a lateral acceleration for enabling said vehicle to follow said evasive path;

means for converting said lateral acceleration to a yaw rate under a static condition;

means for adding a phase advance term to said yaw rate;

means for computing a yaw moment for achieving said yaw rate having said phase advance term added thereto; and means for producing said computed yaw moment in said vehicle.

2. A vehicle operation assist control system according to claim 1, wherein said evasive path is given by a sinusoidally varying lateral acceleration.

3. A vehicle operation assist control system according to claim 1, wherein said means for producing said computed yaw moment in said vehicle comprises means for applying fore-and-aft forces to tires of said vehicle.

* * * * *